C. C. HARBRIDGE.
CARRIER FOR AUTOMOBILES.
APPLICATION FILED JAN. 12, 1914.

1,179,717.

Patented Apr. 18, 1916.
2 SHEETS—SHEET 1.

Witnesses:
Frank J. Blanchard
L. C. French

Inventor:
Chester C. Harbridge
By Fred Gerlach
His Attorney

C. C. HARBRIDGE.
CARRIER FOR AUTOMOBILES.
APPLICATION FILED JAN. 12, 1914.
1,179,717.
Patented Apr. 18, 1916.
2 SHEETS—SHEET 2.
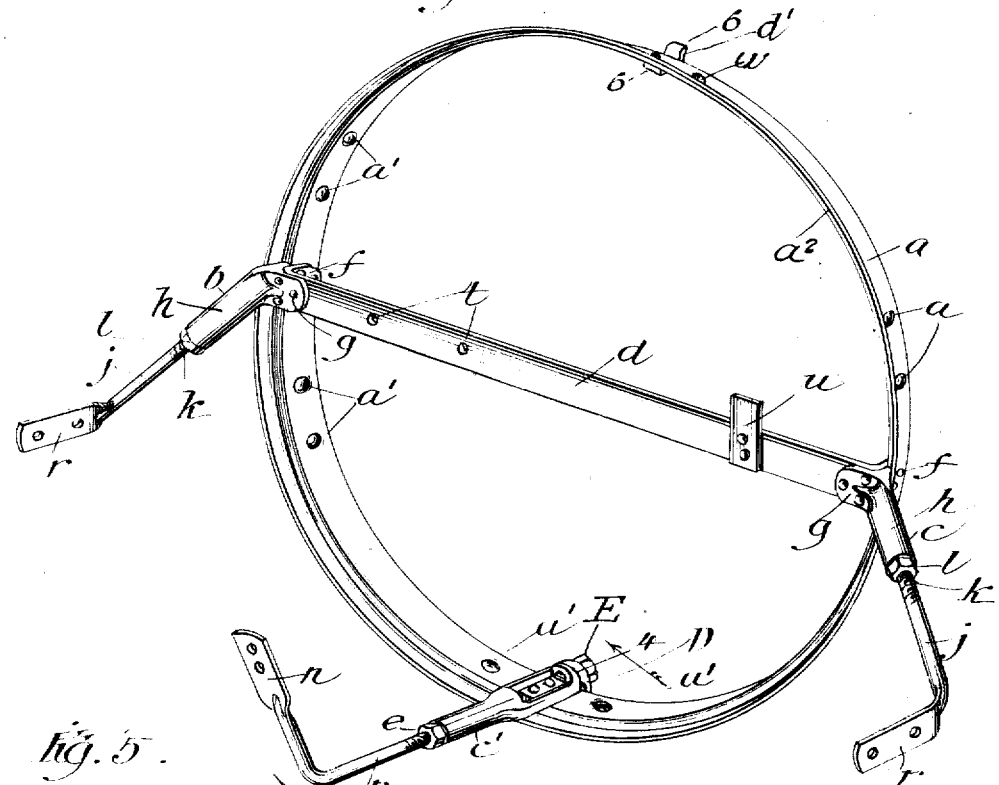
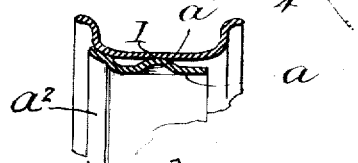
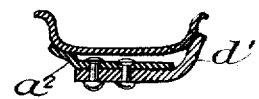
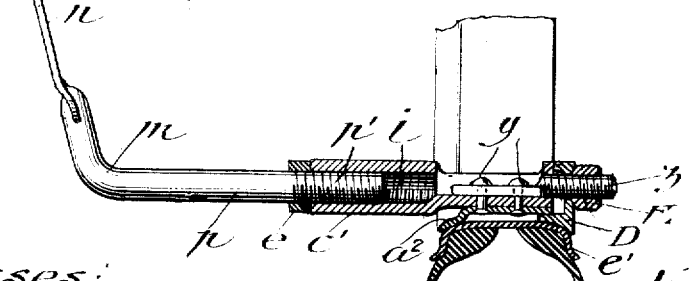
Witnesses:
Frank C. Blanchard
L. C. French
Inventor:
Chester C. Harbridge
By Fred Gerlach
His Attorney

UNITED STATES PATENT OFFICE.

CHESTER C. HARBRIDGE, OF DETROIT, MICHIGAN, ASSIGNOR, BY MESNE ASSIGNMENTS, TO DETROIT TIRE CARRIER CO., OF DETROIT, MICHIGAN. A CORPORATION OF MICHIGAN.

CARRIER FOR AUTOMOBILES.

1,179,717.  Specification of Letters Patent. Patented Apr. 18, 1916.

Application filed January 12, 1914. Serial No. 811,509.

*To all whom it may concern:*

Be it known that I, CHESTER C. HARBRIDGE, a resident of Detroit, in the county of Wayne and State of Michigan, have invented certain new and useful Improvements in Carriers for Automobiles, of which the following is a full, clear, and exact description.

The invention relates to carriers for automobiles and more particularly to devices for carrying a spare tire, a tail lamp and a number plate.

The invention designs to provide an improved carrier which is adapted to be attached to the rear of an automobile and which is adapted to securely hold a spare tire, so that it can be conveniently removed when occasion arises for its use.

The invention further designs to provide a carrier which is adapted to conjointly carry a spare rim, a tail lamp and a number plate, so that separate brackets or attachments for the lamp and plate may be dispensed with and so that the lamp and plate will be disposed within the carrier and will not unduly project from the vehicle.

The invention consists in the several novel features hereinafter set forth and more particularly defined by claims at the conclusion hereof.

Figure 1:
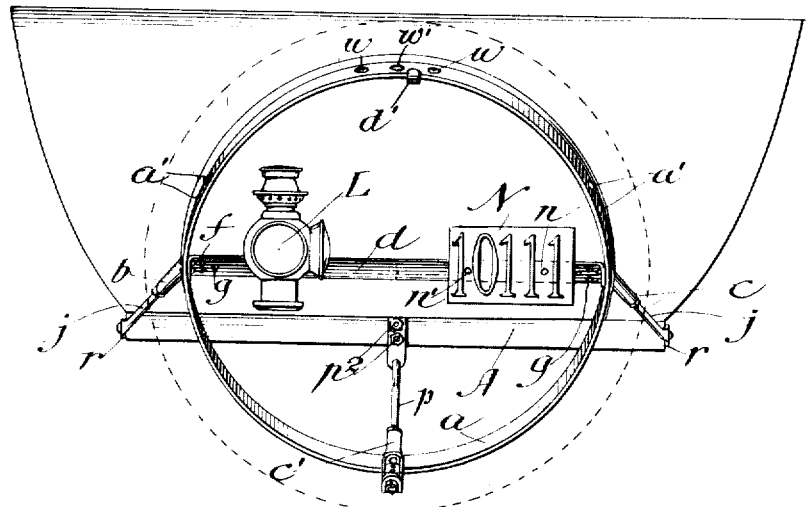
Figure 2:
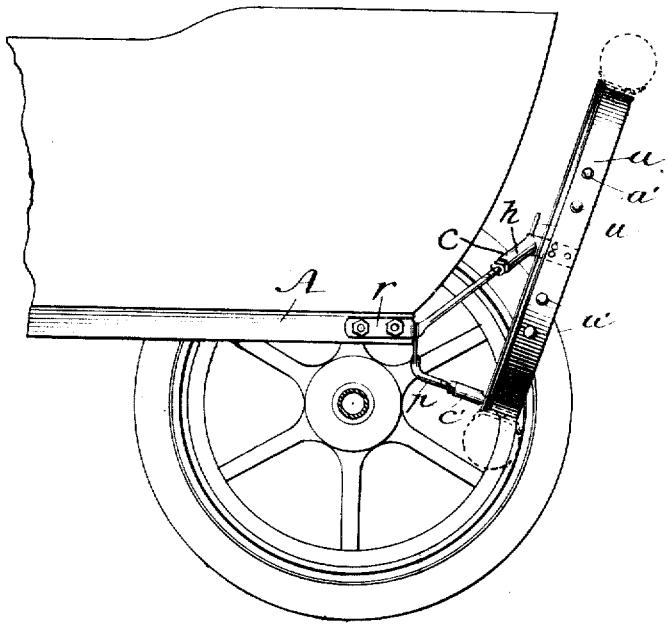

In the drawings: Figure 1 is a front elevation, showing the device attached to the rear of an automobile. Fig. 2 is a side elevation thereof. Fig. 3 is a perspective view of the tire support. Fig. 4 is a section taken on line 4—4 of Fig. 3, showing the tire attached. Fig. 5 is a detail sectional view of the tire supporting ring and the tire rim. Fig. 6 is a section taken on line 6—6 of Fig. 3.

The improved carrier comprises a supporting ring $a$, and means for adjustably securing said ring at the rear of an automobile. The securing means comprises a plurality of side brackets $b$ and $c$. A cross-bar $d$ extends diametrically across the ring $a$ and is secured to the inner side of the supporting ring $a$ at either end by rivets $f$ passing through it and the supporting ring. Cross-bar $d$ serves as a brace for rigidly securing brackets $b$ and $c$ and to rigidly cross connect the side portions of the band or ring $a$. Brackets $b$, $c$ incline outwardly and away from the ring $a$ and are each riveted to bar $d$, as at $g$. Each of the brackets $b$, $c$, comprises a sleeve $h$, as shown in Fig. 3, which has an internally screw-threaded socket, which is adapted to receive a correspondingly threaded terminal $k$ of a bracket-rod $j$ to adjustably connect the rods and brackets. Lock-nuts $l$ are adapted to rigidly secure the rods and sleeves in adjustable relation.

Rods $j$ extend forwardly, downwardly, and outwardly from the ring, and are provided with flattened terminals $r$ which are adapted to fit against the side of the frame A or other suitable part of the body of the vehicle and to be secured to the frame by suitable fastening means, such as bolts, as indicated in Figs. 1 and 2. Brackets $b$, $c$ and rods $j$ serve to secure the sides of the ring or band $a$ in fixed position relatively to the body of the vehicle. By providing screw-threaded adjustments between these rods and brackets, the ring, in being applied to the vehicle, may be tilted more or less, so that it will be disposed the desired distance from the back of the vehicle body and so that the carrier will be adapted for attachment to vehicles of different sizes or shapes. By turning the rods in the sockets, the inclination of the ring may be varied and the terminals $r$ may be separated or brought closer together, thus adapting the carrier for adjustable connection for different vehicles. The lower portion of the ring or band $a$ is also secured on relatively to the vehicle body by means of a bracket $c'$, which is secured to the ring by rivets $y$ and comprises an internally screw-threaded sleeve $i$, which is adapted to receive the screw-threaded terminal $p'$ of a rod $p$ which extends forward from the ring and is provided with an upturned flattened end $n$ whereby it may be secured to the frame A of the vehicle by suitable bolts $p^2$. A nut $e$ serves to lock the socket $i$ and rod $p$ in fixed relation. By providing a screw-adjustment between bracket $c'$ and rod $p$, the lower portion of the band may be adjusted into the desired relation to the frame in applying the carrier to a vehicle. By providing screw-threaded adjustments between all of the bracket and post connections between the ring and the vehicle, the carrier is adapted for general application to vehicles of different sizes and shapes.

Ring $a$ is adapted to receive a demountable rim $e'$ of usual construction and is provided with a flange $a^2$ at the front side thereof against which the rim will be snugly seated and which will serve materially to strengthen or stiffen said ring. This ring is usually formed of the same diameter as the felly band of the wheel for which the demountable rim is adapted. These bands are usually somewhat smaller in diameter than the inner periphery of the rim to permit the wedge-lugs for securing the rim on the wheel to enter the space between the felly band and the rim. To firmly position the demountable rim upon ring $a$ at different points around the periphery of the rim and to prevent the rim from rattling, ring $a$ is indented outwardly, as shown at $a'$, to form bearing surfaces I for the rim. These bearing-surfaces or points cause the rim to fit snugly on the ring $a$. In some instances, demountable rims are formed with studs adjacent the tire flange and holes $w$ are formed in the ring $a$ to receive these studs. When these studs are employed on demountable rims, they will serve to hold the upper portion of the rim from slipping off the ring $a$. In some instances, demountable rims are not formed with such studs, and to secure rims of that type on the ring $a$, the band is formed with an upturned lug or finger $d'$, which will engage the rear side of the upper portion of the demountable rim and prevent displacement of the rim from the upper portion of the ring $a$. However said lug or finger $d'$ is not essential to the operation of the carrier, as the ring $a$ is provided with an aperture $w'$ located substantially at the top of the ring and diametrically opposite the adjustable fastening means hereinafter described, said aperture receiving the tube valve of the tire carried by the demountable rim D, which will serve to retain said demountable rim and its tire firmly in position. The lower portion of the rim is adapted to be securely held on the ring $a$ by means of a wedge-lug D, which is adapted to engage the rear side of the rim, and a nut E on a bolt $z$ by which the wedge-lug may be jammed and locked into position to secure the rim. Bolt $z$ is secured to the ring $a$ by the rivets $y$, which secure the bracket $e'$ to said rim.

In order to place the spare rim on the carrier, it is only necessary to loosen wedge-lug D and turn it upwardly. The upper portion of the rim may then be dropped in place on the upper portion of the ring $a$ and then the rim will be swung forwardly until its lower portion passes nut E. Wedge-lug D will then be forced and secured into position shown in Fig. 4 by nut E and the rim will be securely held on the ring. To remove the rim, it is only necessary to loosen the wedge-lug D to swing the lower portion of the ring rearwardly and then lift it in its entirety to disengage its upper portion from the ring $a$.

A short bar $u$ is riveted to the cross-bar $d$ adjacent one end of said bar and its upper end serves as a lamp-bracket for supporting the tail-lamp L within the carrier. Cross-bar $d$ is also provided with apertures $t$, so that a number plate N may be secured thereto by suitable fastening means, such as bolts $n'$. By securing both the number plate and the lamp bracket to the cross-bar $d$, they will be firmly secured in correct relative position so that the number plate will be disposed within the carrier and where they will not project unduly from the rear of the vehicle.

The invention thus exemplifies a carrier which is adapted for general application by reason of its adjustability and one whereby a demountable rim, a tail-lamp and a number plate may be conjointly sustained. The carrier also exemplifies one on which a heavy demountable rim with a tire thereon will be securely retained, and which permits easy replacement.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a tire carrier, the combination of fixed supporting means secured to a vehicle and adapted to receive and support a demountable rim, and a plurality of rim locking devices carried by said supporting means, one of said devices having fixed means adapted to receive and hold an inward projection on the rim to retain it at one point, the other device being adjustable to lock said rim in position when said rim is engaged by said fixed means.

2. In a tire carrier for vehicles, means adapted to fit into and support a demountable rim at diametrically opposite points, said means adapted to receive and engage the tube valve of the tire carried by said rim, and a clamp on said means operating in conjunction with said tube valve to retain said rim on said supporting means.

3. In a tire carrier for vehicles, means adapted to fit into and support a demountable rim at diametrically opposite points, said means adapted to receive and engage the tube valve of the tire carried by said rim, and a clamp on said means located substantially diametrically opposite to said tube receiving point and adapted to be adjusted into or out of engagement with said rim.

4. In a tire carrier for vehicles, the combination of a supporting ring adapted to fit into a demountable rim, attaching means for securing the ring to a vehicle, fixed means at one point on said ring adapted to engage and retain the rim against removal from the ring at that point, and an adjustable clamp at another point on said ring adapted to be adjusted into or out of engagement with said rim at that point.

5. In a tire carrier for vehicles, the combination of a supporting ring adapted to fit into a demountable rim and having fixed means at one side thereof for retaining the rim, attaching means for securing the ring to a vehicle, fixed means at one point on the other side of said ring adapted to receive and retain the rim at that point, and adjustable means at another point on the latter side of the ring adapted to be adjusted into or out of engagement with said rim at that point.

6. In a carrier for vehicles, the combination of a supporting ring adapted to fit into a demountable rim, attaching means for securing the ring to a vehicle, a fixed lug at one point on said ring adapted to engage and retain said rim at that point, and a rotatable clamping lug at another point on said ring adapted to be turned into or out of engagement with said rim at that point.

7. In a carrier for vehicles, the combination of a supporting ring adapted to fit into a demountable rim, attaching means for securing the ring to a vehicle, a fixed lug at one point on said ring adapted to engage and retain said rim at that point, a rotatable wedge-lug at another point on said ring adapted to be turned into or out of engagement with said rim at that point, and a screw clamp for engaging and retaining said wedge-lug in locking position with respect to said rim.

8. In a carrier for vehicles, the combination of a supporting ring adapted to fit into a demountable rim and having raised bearings thereon for engaging the inner periphery of the demountable rim, attaching means for securing said ring to a vehicle, and means for removably securing the rim to said ring.

9. In a carrier for vehicles, the combination of a supporting ring, and attaching means for securing the rim to a vehicle, said ring being adapted to fit into a demountable rim and having bearings thereon for engaging the inner periphery of the rim, said bearings being formed by indenting the ring outwardly, and means for removably securing the rim to said ring.

10. In a carrier for vehicles, the combination of a ring adapted to receive a demountable rim, a cross bar secured to and extending between the sides of said ring, attaching means carried by said cross bar for securing the ring to a vehicle, and means for removably securing the rim on said ring.

11. In a carrier for vehicles, the combination of a ring, attaching means for securing the ring to a vehicle, fixed means at the top of the ring for holding a demountable rim on the ring, and adjustable means on the lower portion of the ring for holding the lower portion of the rim.

12. In a carrier for vehicles, the combination of a ring, attaching means for securing the ring to a vehicle, said ring being adapted to fit into a demountable rim, and a lamp bracket within the ring and secured thereto.

13. In a carrier for vehicles, the combination of a ring, attaching means for securing the ring to a vehicle, said ring being adapted to fit into a demountable rim, a cross-bar secured to the ring, and a lamp-bracket secured to the cross-bar.

14. In a carrier for vehicles, the combination of a ring, attaching means for securing the ring to a vehicle, said ring being adapted to fit into a demountable rim, and means for securing a number plate within the ring.

15. In a carrier for vehicles, the combination of a ring, attaching means for securing the ring to a vehicle, said ring being adapted to fit into a demountable rim, and a cross-bar provided with means whereby a number plate may be secured within and to the ring.

16. In a carrier for vehicles, the combination of a ring, attaching means for securing the ring to a vehicle, said ring being adapted to fit into a demountable rim, and a cross-bar secured to the ring and provided with means whereby a lamp and a number plate may be secured thereto.

17. In a carrier for vehicles, the combination of a supporting ring adapted to fit into a demountable rim, a peripheral flange formed integral with and extending from said ring at one edge, attaching means for securing the ring to a vehicle, and means for securing the rim on said ring in contact with said flange.

18. An annular tire supporting member adapted to engage the inner periphery of the tire and having an opening therein adapted to accommodate a projection from the tire and provided with an outwardly extending flange from the rear edge thereof, a fastening device carried by the member adjacent its front edge and diametrically disposed relative to the opening, said fastening device adapted to press the tire transversely into engagement with said outwardly extending flange.

19. A tire carrier comprising an annular tire supporting member in the form of a metal rim adapted substantially to fit the inner periphery of the tire, having a free open space therethrough within the periphery thereof and having an outwardly extending flange projecting from one of its edges, a tire engaging member confined to the edge of said rim on the side of the rim opposite the edge provided with the flange and fastening means engaging said tire engaging member to lock the same in position, said fastening means being accessible from said opposite side of the tire supporting member.

CHESTER C. HARBRIDGE.

Witnesses:
MILDRED STUMPF,
ETHEL GERLACH.

DISCLAIMER.

1,179,717.—*Chester C. Harbridge*, Detroit, Mich. CARRIER FOR AUTOMOBILES. Patent dated April 18, 1916. Disclaimer filed May 31, 1924, by the assignee, *Detroit Carrier & Manufacturing Co.*

Hereby enters this disclaimer—

To the combination of claim 17, except where, in such combination, the peripheral flange has a portion which fits into and forms an internal seat for the demountable rim.

Enters this disclaimer—

To the combination of claim 19, except where the outwardly extending flange has a peripheral portion which forms an internal seat for the demountable rim.

[*Official Gazette July 15, 1924.*]